US006830777B2

(12) United States Patent
Danekas et al.

(10) Patent No.: US 6,830,777 B2
(45) Date of Patent: Dec. 14, 2004

(54) METHOD FOR PRODUCING ELECTRICAL CABLES COATED WITH CROSS-LINKED POLYETHYLENE

(75) Inventors: Franz Danekas, Garbsen (DE); Marc Strittmatter, Hannover (DE)

(73) Assignee: Nexans, Paris (FR)

( * ) Notice: Subject to any disclaimer, the term of this patent is extended or adjusted under 35 U.S.C. 154(b) by 0 days.

(21) Appl. No.: 09/910,902

(22) Filed: Jul. 24, 2001

(65) Prior Publication Data

US 2002/0022698 A1 Feb. 21, 2002

(30) Foreign Application Priority Data

Jul. 24, 2000 (EP) .............................................. 00402121

(51) Int. Cl.⁷ ............................ C08L 23/04; H01B 3/44
(52) U.S. Cl. ....................... 427/117; 427/120; 525/254; 525/263
(58) Field of Search ................................ 427/117, 120; 525/254, 263

(56) References Cited

U.S. PATENT DOCUMENTS 4,289,860 A    9/1981  Glander et al.

5,112,919 A  *  5/1992  Furrer et al.

FOREIGN PATENT DOCUMENTS

| EP | 0 365 289 A2 | 4/1990 |
| EP | 0 546 841 A1 | 6/1993 |
| WO | WO 00/36612  | 6/2000 |

OTHER PUBLICATIONS

Patent Abstracts of Japan, Japanese Patent 04–293945, Oct. 19, 1992.

* cited by examiner

Primary Examiner—Jeffrey Mullis
(74) Attorney, Agent, or Firm—Sughrue Mion, PLLC

(57) ABSTRACT

In a method for producing electrical cables coated with cross-linked polyethylene, a polyethylene granulate is mixed with a liquid silane-containing cross-linking agent, the granulate thus prepared is melted in an extruder and extruded onto the electrical cable, and the extruded coating is cross-linked in the presence of water or steam. A mixture of granular material of a polyethylene homopolymer and a polyethylene copolymer is coated with the cross-linking agent. The copolymer content in the coating on the cable is between 1 and 8% by weight.

7 Claims, No Drawings

METHOD FOR PRODUCING ELECTRICAL CABLES COATED WITH CROSS-LINKED POLYETHYLENE

This application is based on and claims priority from European Patent Application No. 00402121.8 filed Jul. 24, 2000, which is incorporated by reference herein.

BACKGROUND OF THE INVENTION

The invention relates to a method for producing electrical cables coated with cross-linked polyethylene Such a method is known from CH 618 450 A1. In this so-called silane cross-linking, reactive low-molecular compounds are grafted on a polymer radical produced by peroxides resulting in polyfunctional coupling points on the macromolecule.

These side branches—e.g., organosilanes—are capable of reacting with other cross-links, so that theoretically a plurality of macromolecules are interconnected at such cross-linking nodes. Grafting is effected by mechanically stressing the components, e.g., by intensive mixing and kneading in a mixer or extruder at elevated temperatures.

The actual cross-linking occurs in a second step in the presence of a catalyst under the influence of water. The catalyst is required to achieve suitable cross-linking rates. For this purpose, the electrical cables provided with the insulating coating are placed in a high-humidity atmosphere or in a water bath. Since the water can get into the polymer only by diffusion, both the temperature and the wall thickness of the product to be cross-linked affect the cross-linking time.

In cable technology—particularly in the production of medium voltage cables—the so-called Monosil method and the Sioplas method have become known. The Monosil method is a single-step method, i.e., the individual components are placed into an extruder. Mixing, homogenizing, grafting and extruding are thus accomplished in a single working step.

In the Sioplas method, the components, except for the catalyst, are placed into an extruder, where they are mixed, homogenized, grafted and subsequently granulated. The granulate together with a separately packed catalyst batch is then usually supplied to the cable factory. At the factory, the two components—grafted granulate and catalyst batch—are placed into an extruder, melted, extruded onto the electrical cable and then cross-linked in the presence of water or steam.

Medium or high-voltage cables with a polyethylene insulation coating may have defects in the form of voids, impurities as well as surface defects that could lead to so-called electrical tree formation. In the presence of moisture and electrical stress, water trees may occur, which eventually destroy the insulation coating.

It has been attempted to prevent these disadvantages by using triple extrusion, i.e., by simultaneously producing an inner conductive layer, an insulation layer and an outer conductive layer through coextrusion by means of a triple extruder head. This makes it possible to minimize impurities and voids in the insulation layer or between the layers.

It has also been attempted to optimize the insulation material. A method has been described in which water tree inhibitors derived from polymers, e.g., organopolysiloxanes, polyethylene glycols, epoxy resins, polypropylene, polystyrene, and polyvinyl alcohol, are added to the polyethylene during its production. The desired effects and the influence on water tree growth vary widely. In many instances, the additives are detrimental to the homogeneity and the resistance to aging of the polyethylene as well as the electrical properties of the polyethylene.

The above optimizations have not yet been tried with silane cross-linking, so that no predictions can be made as to the influence of these additives on the cross-linking mechanism in silane cross-linking.

SUMMARY OF THE INVENTION

Thus, an object of the present invention is to provide a method for producing medium or high-voltage cables by means of silane cross-linking to provide a cost-effective cable with increased resistance against water treeing and consequently a longer service life.

This object is attained by a method for producing electrical cables coated with cross-linked polyethylene, in which a polyethylene granulate is mixed with a liquid silane-containing cross-linking agent, the granulate mixture thus prepared is melted in an extruder and extruded onto the electrical cable, and the extruded coating is cross-linked in the presence of water or steam, wherein the granulate mixture comprises a mixture of a granular material of a polyethylene homopolymer and a copolymer of ethylene, and wherein the copolymer content in the insulating coating on the cable is between 1 and 8% by weight. In this method, the granulate mixture can be coated with a liquid mixture of silane, peroxide and possibly a stabilizer prior to a compounding process, or it can be coated with a liquid mixture of silane, peroxide and possibly a stabilizer during the compounding process. Also, in this method, the granulate material coated with cross-linking agent can be grafted, homogenized and subsequently regranulated; the regranulate provided with a catalyst or a catalyst batch can be introduced into an extruder, extruded onto the electrical cable, and the coating extruded onto the electrical cable is cross-linked in the presence of water or steam, or the granulate polyethylene homopolymer material alone can be coated with the liquid cross-linking agent in a compounding system, melted, grafted, homogenized and subsequently regranulated, and the regranulate and a granular copolymer of ethylene and a catalyst, are placed into an extruder, where the mixture is melted, homogenized and extruded onto the electrical cable, wherein the compounding system can include an extruder. In the method, the copolymer of ethylene used can be an ethylene-acrylate copolymer which is an ethylene butyl acrylate (EBA), an ethylene ethyl acrylate (EEA) or an ethylene methyl acrylate (EMA), and the acrylate content in the copolymer of ethylene is 10%–35% by weight. In the method, a granular material of polyethylene homopolymer and copolymer of ethylene can be placed into an extruder, a liquid mixture of silane, peroxide and possibly a stabilizer as well as a catalyst or a highly concentrated catalyst batch is likewise placed into the extruder, and the mixture is melted, grafted and homogenized in the extruder, and the grafted, homogenized material is extruded onto the electrical cable and cross-linked in the presence of water or steam.

A significant advantage of the invention is that the use of a mixture of a polyethylene homopolymer and polyethylene copolymer with a limited copolymer content can significantly increase the resistance of the cable insulation against the formation of water trees. An LDPE and/or LLDPE-based polyethylene homopolymer may be used, which is offered in bulk at low cost by many polymer manufacturers primarily for processing into polyethylene foils. This eliminates costly "specialties" offered by polymer manufacturers.

DETAILED DESCRIPTION OF THE INVENTION

The invention will now be described in greater detail with the aid of some exemplary embodiments.

EXAMPLE 1
(Two-step Process)

80 parts LDPE with a density of 0.92 g/ccm in granular form and 20 parts polyethylene copolymer with a copolymer content of 20%, also in granular form, and 1.8 parts of a liquid organosilane (VTMOS), 0.2 parts of a stabilizer and 0.10 parts peroxide are placed into an extruder and intimately mixed. The liquid mixture diffuses into the surface of the granulate. In the continued process in the extruder, the granular mixture is melted due to both mechanical mixing of the granulates and an external heat supply. Within the extruder, the silane is initially grafted on the LDPE polyethylene or the polyethylene copolymer and the melt is homogenized. A breaker plate is located at the end of the extruder with a rotating knife behind it, which cuts the molten strands into a granulate.

The granulate thus produced may be stored and, when required, placed into an extruder by means of which an insulation coating is applied to the electrical cable. A catalyst batch is added to the grafted granulate either in, or in front of, the extruder. The insulation coating is then cross-linked at an elevated temperature in a water bath or a steam room.

EXAMPLE 2
(One-step Process)

85 parts LLDPE with a density of 0.92 g/ccm, 15 parts polyethylene copolymer with a 28% copolymer content, each in granular form, together with 1.5 parts of a liquid organosilane (VTMOS), 0.2 parts stabilizer, 0.08 parts peroxide and 0.06 parts catalyst are placed into an insulation extruder, where they are first intimately mixed so that the liquid components, i.e., silane, stabilizer, peroxide and catalyst, diffuse into the granulate. This diffusion process is accelerated with increased heating. In the further process, the silane is grafted on the LLDPE and the polyethylene copolymer within the insulation extruder and homogenization takes place. The homogenized melt is extruded onto the electrical cable and cooled in a water bath. In the water bath, partial cross-linking of the outer surface layers of the insulation already takes place.

The insulated electrical cable wound onto a cable drum is then placed into a steam room or a water bath where it is stored for a prolonged time at elevated temperatures of 75° C.–90° C. during which the insulation layer cross-links completely.

For both example 1 and example 2, the polyethylene copolymer may be introduced into the extruder together with the silane, the stabilizer and the peroxide as a master batch.

It may also be advantageous to add the catalyst together with the polyethylene copolymer or a portion of the copolymer as a catalyst batch. This catalyst batch is added to the grafted homopolymer granulate either in, or in front of, the insulation extruder.

It is a significant advantage if the polyethylene copolymer is added in such an amount with respect to its copolymer content and/or its parts so that the copolymer content in the insulation layer is between 1 and 8% by weight.

Tests have shown that the cables produced according to the teaching of the invention exhibit significantly greater resistance against water treeing than cables having a pure polyethylene homopolymer insulation coating.

The electric strength of the cables produced according to the invention is approximately 30% higher in a wet aging test, so that a longer service life may be expected under the action of moisture in a typical underground installation of the cables.

What is claimed is:

1. A process for the production of an electrical cables comprising at least one conducting wire coated with cross-linked polyethylene, the process comprising the steps of mixing a material made of polyethylene, a liquid silane-containing cross-linking agent and stabilizer to form a mixture, melting said mixture in an extruder to form a melt, extruding said melt onto the conducting wire to form an extruded layer on the wire and cross-linking said extruded layer in the presence of water or steam, wherein said material made of polyethylene comprises a mixture of granulate made of polyethylene homopolymer and a copolymer of ethylene, said copolymer comprises at least one of ethylene-butyl acrylate (EBA), ethylene-ethyl acrylate (EEA) and ethylene-methyl acrylate (EMA) and the acrylate portion of said copolymer is from 10–35 wt % of said copolymer and said copolymer is between 1 and 8 weight percent of said extruded layer.

2. A method as claimed in claim 1, wherein the granulate mixture is coated with a liquid mixture of silane, peroxide and possibly a stabilizer prior to a compounding process.

3. A method as claimed in claim 1, wherein the granulate mixture is coated with a liquid mixture of silane, peroxide and possibly a stabilizer during the compounding process.

4. A method as claimed in claim 1, wherein the granulate material coated with the cross-linking agent is grafted, homogenized and subsequently regranulated.

5. A method as claimed in claim 4, wherein the regranulate provided with a catalyst or a catalyst batch is introduced into an extruder, extruded onto the conducting wire, and the coating extruded onto the conducting wire is cross-linked in the presence of water or steam.

6. A method as claimed in claim 4, wherein the granular polyethylene homopolymer material alone is coated with the liquid cross-linking agent in a compounding system, melted, grafted, homogenized and subsequently regranulated, and the regranulate and a granular copolymer of ethylene, and a catalyst, are placed into an extruder, where the mixture is melted, homogenized and extruded onto the conducting wire and cross-linked.

7. A method as claimed in claim 1, wherein a granular material of polyethylene homopolymer and copolymer of ethylene is placed into an extruder, a liquid mixture of silane, peroxide and possibly a stabilizer as well as a catalyst or a highly concentrated catalyst batch is likewise placed into the extruder, and the mixture is melted, grafted and homogenized in the extruder, and the grafted, homogenized material is extruded onto the conducting wire and cross-linked in the presence of water or steam.

* * * * *